United States Patent
Watabe et al.

(10) Patent No.: US 7,135,130 B2
(45) Date of Patent: Nov. 14, 2006

(54) ELECTROLUMINESCENT PHOSPHOR AND ITS PRODUCTION METHOD

(75) Inventors: Junya Watabe, Kanagawa (JP); Yoshiki Kanno, Kanagawa (JP); Shigenobu Matsumura, Kanagawa (JP)

(73) Assignee: Nemoto & Co. Ltd., Tokyo (JP)

( * ) Notice: Subject to any disclaimer, the term of this patent is extended or adjusted under 35 U.S.C. 154(b) by 0 days.

(21) Appl. No.: 10/775,862

(22) Filed: Feb. 10, 2004

(65) Prior Publication Data
US 2004/0169160 A1 Sep. 2, 2004

(30) Foreign Application Priority Data
Feb. 12, 2003 (JP) .............................. 2003-034114

(51) Int. Cl.
*C09K 11/56* (2006.01)
*C09K 11/54* (2006.01)

(52) U.S. Cl. ............................................. 252/301.6 S

(58) Field of Classification Search .......... 252/301.6 S
See application file for complete search history.

(56) References Cited

FOREIGN PATENT DOCUMENTS

JP  07-090262  4/1995

*Primary Examiner*—C. Melissa Koslow
(74) *Attorney, Agent, or Firm*—Dennis G. Lapointe

(57) ABSTRACT

The invention provides electroluminescent phosphor having superior luminance and a long life. The host material is ZnS.aAO, of which "A" is at least one element selected from among magnesium (Mg), calcium (Ca), strontium (Sr), and barium (Ba). "a" ranges from 0.001 to 0.01. Either one of or both copper (Cu) or manganese (Mn) is contained as an activator. At least one element selected from among chlorine (Cl), bromine (Br), iodine (I), and aluminum (Al) is contained as a co-activator. The luminance and life span of the electroluminescent phosphor can be increased by limiting "a", which represents the proportion of alkaline earth metal oxide (AO) introduced into the zinc sulfide, within the range of 0.001 to 0.01.

3 Claims, 2 Drawing Sheets

ELECTROLUMINESCENT PHOSPHOR AND ITS PRODUCTION METHOD

FIELD OF THE INVENTION

The present invention relates to electroluminescent phosphor with a host material that can be represented by the formula ZnS.aAO, wherein "A" is at least one element selected from among magnesium (Mg), calcium (Ca), strontium (Sr), and barium (Ba). The invention also relates to a method of producing such electroluminescent phosphor.

BACKGROUND OF THE INVENTION

A conventional organic dispersion electro luminescence (EL) element typically includes a luminescent layer, which is formed by dispersing electroluminescent phosphor in dielectric, and two electrodes respectively disposed at both sides of the luminescent layer so that the organic dispersion EL panel emits light when an AC voltage is applied between the electrodes. At least one of the electrodes is a transparent electrode. Such an organic dispersion EL panel is typically used in a back light of a cell phone or other displays.

A typical example of electroluminescent phosphors used in organic dispersion EL panels of this type is a zinc sulfide phosphor using zinc sulfide (ZnS) as a host material, which contains an activator and a co-activator. The activator contains either one of or both copper (Cu) or manganese (Mn). The co-activator contains at least one element selected from among chlorine (Cl), bromine (Br), iodine (I), and aluminum (Al).

Various methods have conventionally been offered to improve luminous efficiency, life span, and other various characteristics of electroluminescent phosphor of the zinc sulfide type. One of the known examples calls for adding an activator and a co-activating and particle growth-accelerating agent (flux) to a host material, which is made of zinc sulfide or the like, eliminating unformed particles by adding a non-halide magnesium compound during the firing process, and evening out the size and shape of particles. One concrete example of such methods is described in Patent Reference Document 1, which refers to a method of forming electroluminescent phosphor by applying a primary firing treatment to a mixture consisting of a host material, to which an activator and a co-activating and particle growth-accelerating agent (flux) have been added, and subjecting the mixture to a secondary firing. This method characteristically calls for adding a non-halide magnesium compound to the mixture during either one of or both the primary firing and the secondary firing so that the molar ratio of the non-halide magnesium compound is in the range of 0.001 to 0.1, i.e. 0.1 to 10 mol %, to 1 mol of the host material.

Patent Reference Document 1

Japanese Laid-open Patent Publication No. 1996-90262 (Page 3, FIG. 1)

The description of the method of producing electroluminescent phosphor in the reference document mentioned above refers to magnesium sulfate as an example of a non-halide magnesium compound. The description also refers to magnesium oxide and magnesium nitrate as other examples of suitable compounds. In the case of the method described above, however, the non-halide magnesium compound is used merely to prevent generation of unformed particles or not-fully-formed particles so as to even out the size and shape of particles. There is a reference in the above patent document to the effectiveness of adding a magnesium compound during the secondary firing process. However, as the secondary firing is performed at a temperature ranging from 700 to 750° C., it is difficult for solid chemical reaction to progress between the zinc sulfide and the magnesium compound, which may be magnesium sulfate.

For the reasons as above, the aforementioned electroluminescent phosphor production method is unable to produce electroluminescent phosphor having luminance and life span that meet the demands of the users for a wide range of uses for the electroluminescent phosphor. It is therefore necessary to improve the luminance and life span of electroluminescent phosphor produced by a conventional method, such as the one described above.

In order to solve the above problems, an object of the present invention is to provide electroluminescent phosphor having superior luminance and a long life.

SUMMARY OF THE INVENTION

Electroluminescent phosphor according to the invention comprises a host material, an activator, and a co-activator, wherein the host material can be represented by the formula ZnS.aAO, of which "A" is at least one element selected from among magnesium (Mg), calcium (Ca), strontium (Sr), and barium (Ba), and "a" ranges from 0.001 to 0.01; either one of or both copper (Cu) or manganese (Mn) as the activator; and at least one element selected from among chlorine (Cl), bromine (Br), iodine (I), and aluminum (Al) as the co-activator.

As a result of such features as the host material being represented by the formula ZnS.aAO, of which "A" is at least one element selected from among magnesium (Mg), calcium (Ca), strontium (Sr), and barium (Ba), and "a" ranges from 0.001 to 0.01, either one of or both copper (Cu) or manganese (Mn) as the activator, and at least one element selected from among chlorine (Cl), bromine (Br), iodine (I), and aluminum (Al) as the co-activator, the luminance and life span of the electroluminescent phosphor can be increased by adding AO to the zinc sulfide, which is the host material. Should "a", which represents the proportion of AO, be less than 0.001, the luminance and life span of the electroluminescent phosphor are nearly the same as those in the case of when "a" is 0. In other words, AO of less than 0.001 produces practically no effect. Should "a" exceed 0.01, the proportion of AO that does not contribute to emission of light increases and thereby impairs the luminance. Therefore, limiting "a" within the range of 0.001 to 0.01 improves the luminance and life span of the electroluminescent phosphor.

An electroluminescent phosphor production method according to the invention comprises a primary firing process, an intermediate manufacturing process, a secondary firing process, and an etching process. The primary firing process consists of firing at a temperature ranging from 1150 to 1350° C. a mixture produced by adding to zinc sulfide (ZnS) a material of an activator, a material of a co-activator, at least one kind of compounds selected from among alkaline earth metal oxides and compounds that change into alkaline earth metal oxides when fired, and a crystal growing agent. The material of an activator is at least one kind of compounds selected from among copper compounds and manganese compounds. The material of a co-activator is at least one kind of compounds selected from among halides and aluminum compounds. Halide is used as the crystal growing agent. The intermediate manufacturing process consists of producing an intermediate by washing, filtrating, and drying a fired substance resulting from the primary firing process. The secondary firing process consists of crystal transformation of a part of the intermediate produced from the intermediate manufacturing process. The etching process consists of etching the intermediate which has been fired by the secondary firing process.

By following the method described above, a mixture produced by adding to zinc sulfide (ZnS) at least one kind of compounds selected from among copper compounds and manganese compounds as a material of an activator, at least one kind of compounds selected from among halides and aluminum compounds as a material of a co-activator, at least one kind of compounds selected from among alkaline earth metal oxides and compounds that change into alkaline earth metal oxides when fired, and a halide or halides serving as a crystal growing agent is fired at a temperature ranging from 1150 to 1350° C. as the primary firing process. After the intermediate manufacturing process for producing an intermediate by washing, filtrating, and drying the fired substance resulting from the primary firing process, the secondary firing process is performed by crystal transformation of a part of the intermediate produced from the intermediate manufacturing process. Thereafter, the etching process is performed by etching the intermediate which has been fired by the secondary firing process. As this method permits effective introduction of alkaline earth metal oxide into the resulting electroluminescent phosphor, the luminance and life span of the electroluminescent phosphor are improved. Should the firing temperature for the primary firing process be lower than 1150° C., neither the luminance nor life span of the electroluminescent phosphor is improved, because such a low temperature impairs progress of solid chemical reaction between the zinc sulfide and the alkaline earth metal oxide, making the introduction of the alkaline earth metal oxide into the zinc sulfide difficult. A firing temperature higher than 1350° C. for the primary firing process would promote excessive growth of zinc sulfide particles, making control of particle size difficult, and also increases sublimation, resulting in reduced yield. For the reasons being as above, limiting the firing temperature for the primary firing process within the range of 1150 to 1350° C. improves the luminance and life span of the electroluminescent phosphor.

According to the invention, magnesium oxide (MgO) is used as an alkaline earth metal oxide, and at least one of the compounds selected from among magnesium carbonate ($MgCO_3$), basic magnesium carbonate, calcium carbonate ($CaCO_3$), calcium hydroxide ($Ca(OH)_2$), strontium carbonate ($SrCO_3$), strontium nitrate ($Sr(NO_3)_2$), barium carbonate ($BaCO_3$), and barium oxalate ($BaC_2O_4$) is used as a compound that changes into an alkaline earth metal oxide when fired.

By using magnesium oxide (MgO) as the alkaline earth metal oxide and at least one of the compounds selected from among magnesium carbonate ($MgCO_3$), basic magnesium carbonate, calcium carbonate ($CaCO_3$), calcium hydroxide ($Ca(OH)_2$), strontium carbonate ($SrCO_3$), strontium nitrate ($Sr(NO_3)_2$), barium carbonate ($BaCO_3$), and barium oxalate ($BaC_2O_4$) as the compound that changes into an alkaline earth metal oxide when fired, electroluminescent phosphor having superior luminance and life span can be produced.

DETAILED DESCRIPTION OF THE PREFERRED EMBODIMENT

Figure 1:
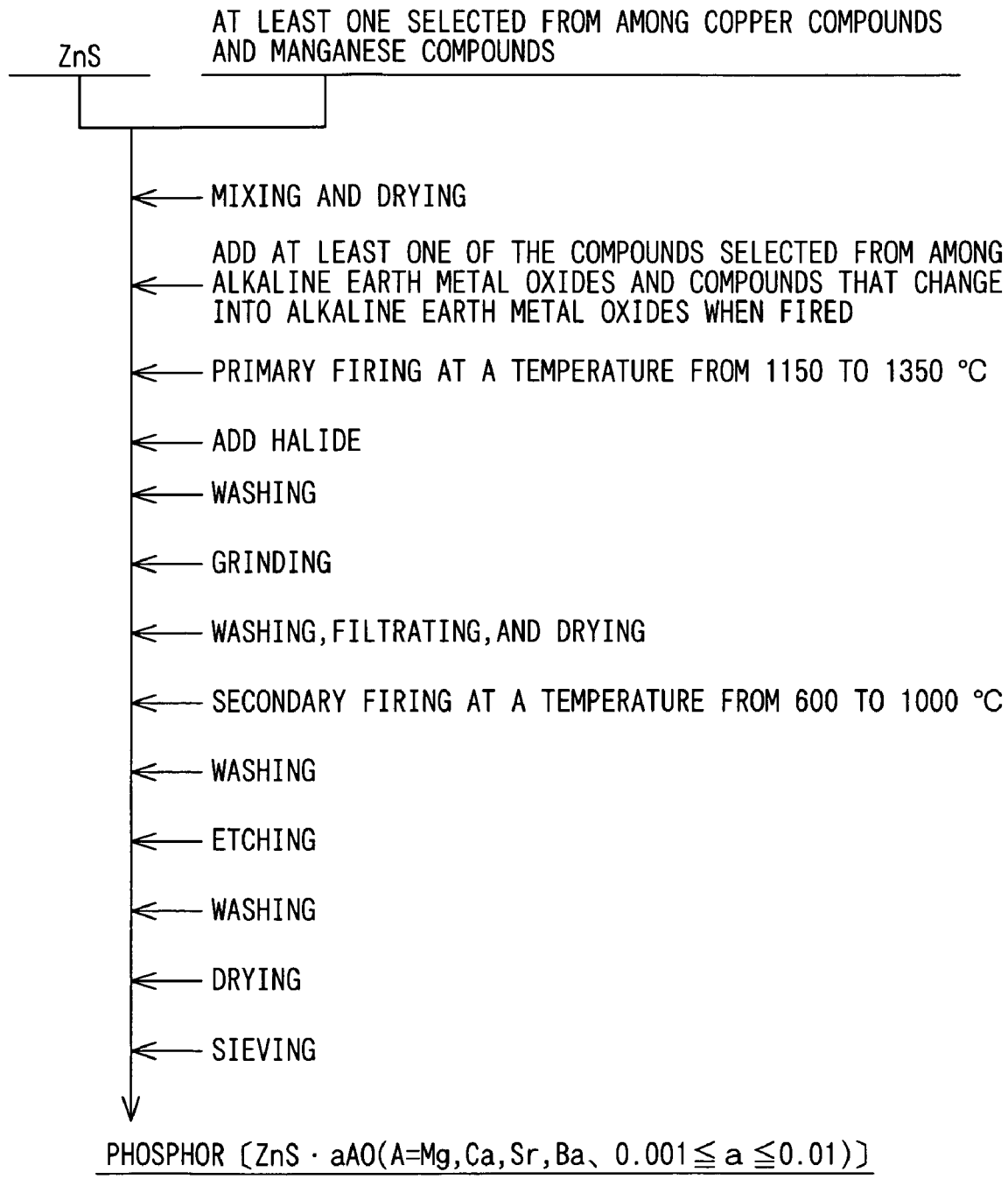
FIG. 1 is a flow chart showing an electroluminescent phosphor production method according to an embodiment of the present invention.

The production processes for producing electroluminescent phosphor according to an embodiment of the present invention is explained hereunder, referring to FIG. 1.

Zinc sulfide (ZnS) particles having a diameter of approximately 1 to 3 μm are dispersed in deionized water. A copper compound, such as copper sulfate pentahydrate ($CuSO_4.5H_2O$), or manganese compound, such as manganese sulfate ($MnSO_4$), is thoroughly mixed into the deionized water, in which the zinc sulfide is dispersed, so as to make an evenly mixed mixture. The aforementioned copper compound or manganese compound is used as the raw material for copper (Cu) or manganese (Mn) to serve as an activator.

Thereafter, the mixture is dried, and at least one compound selected from various alkaline earth metal oxides and compounds that change into alkaline earth metal oxides when fired is added to the mixture. The term "alkaline earth metal oxides" refers to alkaline earth metal oxides as they are, such as magnesium oxide (MgO). Examples of "compounds that change into alkaline earth metal oxides when fired" include alkaline earth metal carbonates, such as calcium carbonate ($CaCO_3$), strontium carbonate ($SrCO_3$), and barium carbonate ($BaCO_3$), basic carbonates, such as basic magnesium carbonate (e.g. $4MgCO_3.Mg(OH)_2.5H_2O$), hydroxides, nitrates, and oxalates.

Halide which serves as a crystal glowing agent, i.e. flux, is mixed into the mixture. Examples of halides to be used for this purpose include various alkali metal halides, such as sodium chloride (NaCl), and alkaline earth metal halides, such as barium chloride ($BaCl_2$) and magnesium chloride ($MgCl_2$). Depending on the halide to be used as the flux, halogen, such as chlorine (Cl), is added to serve as a co-activator. In addition, an aluminum compound, such as aluminum sulfate ($Al_2(SO_4)_3.18H_2O$), may be mixed into the mixture to serve as a co-activator.

Next, a fired substance is obtained by filling the mixture obtained as above in a heat resisting container, such as a quarts crucible, and firing the mixture in the container in the air at a temperature ranging from 1150 to 1350° C. for a period of three to eight hours. This procedure is referred to as the primary firing process.

Next, an intermediate manufacturing process is performed to obtain an intermediate. The intermediate manufacturing process consists of steps of washing the fired substance, which has been obtained by the primary firing process, with deionized water or the like to remove excess alkali metal halide and/or alkaline earth metal halide used as the flux or for other purposes, adding deionized water to the washed substance so as to make the particle size nearly uniform, and applying wet pulverization with a ball mill, further washing, filtrating, and drying in the aforementioned sequence.

The intermediate obtained by the intermediate manufacturing process has an α-crystal structure (hexagonal wurtzite type). Therefore, in order to transform a part of the α-crystal structure to a β-crystal structure (cubic zincblende type), thereby making the intermediate suitable to be used as electroluminescent phosphor, a secondary firing process is performed. The secondary firing process consists of steps of mixing a small amount of copper sulfate or zinc sulfate ($ZnSO_4$) into the intermediate, filling the mixture into a heat resisting container, such as a quarts crucible, firing the mixture at an appropriate temperature, for example, in the range of 600 to 1000° C., in the air for a period of 1 to 2 hours, and gradually cooling it down.

After the intermediate manufacturing process, the resulting intermediate is washed with deionized water or the like several times and, thereafter, undergoes an etching process, which calls for washing the intermediate with hydrochloric acid or the like and a cyanogen treatment using cyanides.

After the etching process, the intermediate is washed with deionized water or the like several times and, thereafter, dried and sieved. As a result, electroluminescent phosphor having a given particle size is obtained.

The host material of the electroluminescent phosphor thus obtained can be represented by the formula ZnS.aAO, wherein "A" is at least one element selected from among magnesium (Mg), calcium (Ca), strontium (Sr), and barium (Ba). Furthermore, "a" is a value that is not smaller than 0.001 and not greater than 0.1, i.e. $0.001 \leq a \leq 0.01$. The electroluminescent phosphor also contains either one of or both copper (Cu) or manganese (Mn), each of which serves as an activator, and at least one element selected from among chlorine (Cl), bromine (Br), iodine (I), and aluminum (Al), each of which serves as a co-activator.

WORKING EXAMPLES

Next, working examples according to the embodiment described above are explained.

(Test 1)

First, a test was performed to evaluate the relationship between proportions of the alkaline earth metal oxide to the zinc sulfide and properties of electroluminescent phosphor, i.e. its luminance and life span.

In the manner described above, 500 g of zinc sulfide (ZnS) was dispersed in deionized water, and an aqueous solution of copper sulfate was mixed into the zinc sulfide-infused deionized water so as to make a mixture with copper concentration to the zinc sulfide being 0.05% by mass.

Thereafter, the mixture was dried at 120° C., and 0.62 g of magnesium oxide (MgO) was added to the mixture so that the molar ratio of the magnesium oxide to the zinc sulfide is 0.003. After chlorides that would serve as a crystal glowing agent, i.e. flux, are added to the mixture at a total mixing ratio of 8% by mass to the zinc sulfide, the mixture was thoroughly mixed. The chlorides used for this purpose were sodium chloride (NaCl), barium chloride ($BaCl_2$) and magnesium chloride ($MgCl_2$), with their mixing ratios to the zinc sulfide being 2% by mass, 3% by mass and 3% by mass respectively.

Next, the primary firing process was performed by filling the mixture in a quarts crucible and firing it in the air at 1250° C. for three hours. Thereafter, excess chlorides (the crystal growing agent) and other unnecessary substances were removed from the fired substance, which resulted from the primary firing process, by washing the substance with deionized water until the electric conductivity of the supernatant liquid became less than 30 μS. Thereafter, the fired substance was filtrated and dried at 110° C. Thus, cleaned substance was obtained.

After the fired substance was placed in a pot and ground by means of a low-speed mill for approximately two hours, the ground substance underwent washing with deionized water, filtrating, and drying so that an intermediate was obtained. After anhydrous copper sulfate ($CuSO_4$) and anhydrous zinc sulfate ($ZnSO_4$) were added to the intermediate with mixing ratios of 1% and 3% by mass respectively, the mixture was thoroughly mixed and placed in a quarts crucible. With the quarts crucible covered, the mixture was subsequently fired in the air at 800° C. for two hours. Thus, the secondary firing process was completed.

After the intermediate that had undergone the secondary firing process was dispersed in deionized water to be washed therewith three times, the etching process was performed by applying acid cleaning with hydrochloric acid and a cyanogen treatment using cyanides to the washed intermediate. Thereafter, the intermediate that had undergone the acid cleaning and the cyanogen treatment was further washed with deionized water three times, which was then followed by filtrating, drying and sieving. Thus, electroluminescent phosphor (ZnS.0.003MgO:Cu,Cl) was obtained.

In order to measure the luminance and life span of the electroluminescent phosphor (ZnS.0.003MgO:Cu,Cl) obtained as above, an EL panel for evaluation was produced by a process that comprises steps of adding 3 parts of epoxy resin as a binder to 7 parts of electroluminescent phosphor so as to make phosphor paste and disposing transparent electrodes respectively on both sides of the phosphor paste. As a result, an EL panel that includes a 100 μm thick phosphor layer between the transparent electrodes was formed.

Upon causing the EL panel to emit light by applying a 200 V, 400 Hz AC voltage between the transparent electrodes of the EL panel, the luminance of the EL panel was measured by using a luminance meter (product of Minolta, type: LS-100).

The life span was measured by a process comprising steps of placing the EL panel in a desiccator, causing the EL panel to emit light by applying a 200 V, 400 Hz AC voltage between the transparent electrodes of the EL panel, and measuring the luminance half-life, i.e. the time taken for the luminance to fall to half its original value.

Samples of electroluminescent phosphor having various concentrations of magnesium oxide (MgO) were produced in the same manner as above so that the samples contain magnesium oxide (MgO) with molar ratios of 0.0005, 0.001, 0.005, 0.01, 0.05, and 0.1 to zinc sulfide (ZnS), which was the raw material for the host material. Thereafter, EL panels were produced from these samples, and the luminance and life span of each EL panel were measured in the same manner as described above.

As a comparison sample, electroluminescent phosphor was produced in the same manner as above except that no magnesium oxide was contained. The luminance and life span of the comparison sample were also measured in the same manner as described above.

Figure 2:
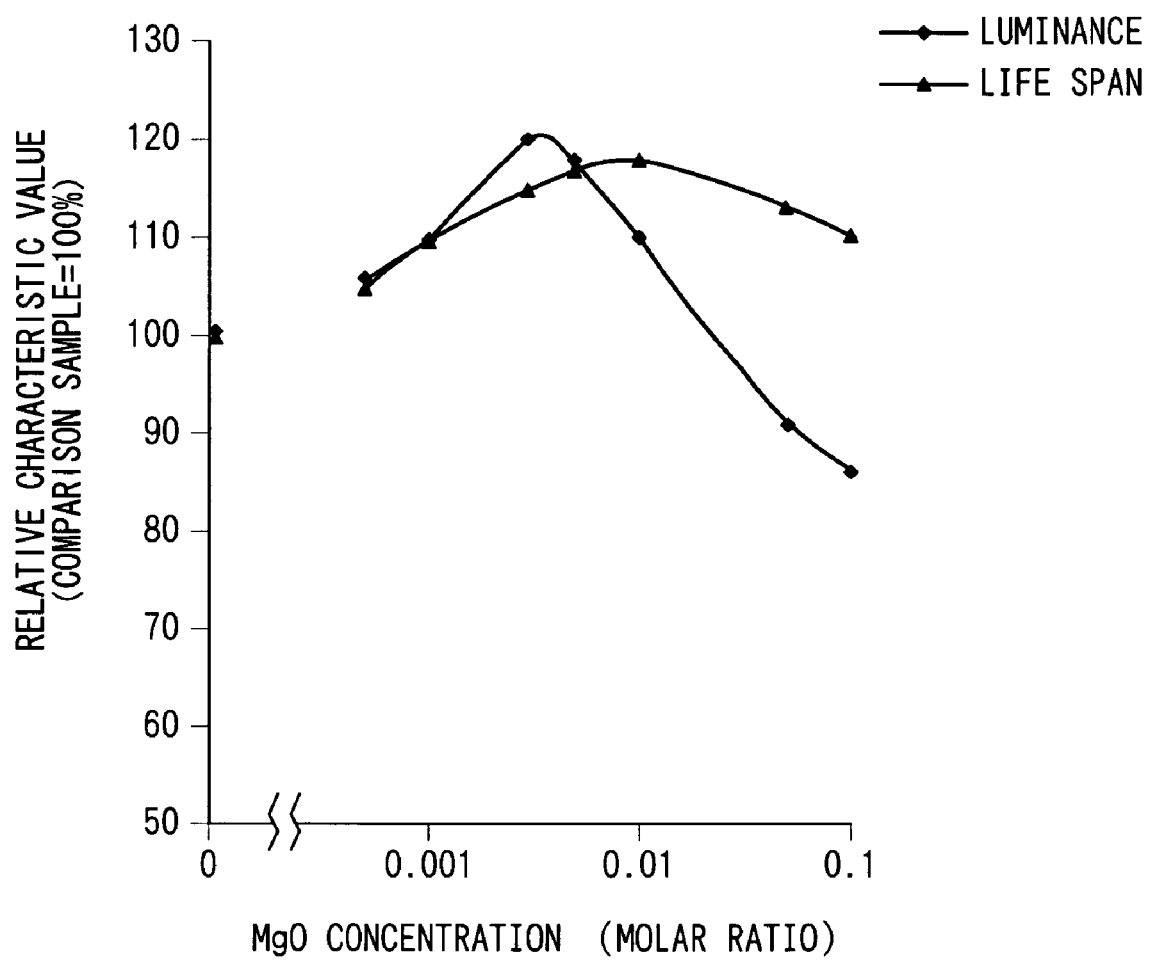
FIG. 2 is graph showing the luminance and life span with respect to changes in the concentration (molar ratio) of magnesium oxide.

Results of the test are shown in Table 1 and FIG. 2. Table 1 and FIG. 2 show the respective luminances of the EL panels produced from the electroluminescent phosphor samples having different magnesium oxide concentrations, with the luminance of the comparison sample shown to be 100%. FIG. 2 shows the respective luminance half-lives of the EL panels produced from the electroluminescent phosphor samples having different magnesium oxide contents with the luminance half-life of the comparison sample shown to be 100%.

TABLE 1

| Sample | MgO molar ratio (=a) | Luminance (%) | Life span (Luminance half-life) (hrs) |
|---|---|---|---|
| Comparison sample | 0 | 100 | 250 |
| Working example 1-(1) | 0.0005 | 106 | 263 |
| Working example 1-(2) | 0.001 | 110 | 275 |
| Working example 1-(3) | 0.003 | 120 | 288 |
| Working example 1-(4) | 0.005 | 118 | 292 |
| Working example 1-(5) | 0.01 | 110 | 295 |
| Working example 1-(6) | 0.05 | 91 | 283 |
| Working example 1-(7) | 0.1 | 86 | 274 |

As is evident from the test results shown in Table 1, Examples 1-(1) to 1-(7), which contain magnesium oxide, have different luminances and life-spans with respect to the comparison sample, which does not contain magnesium oxide. Particularly, when the molar ratio of the magnesium oxide is in the range of 0.0005 to 0.01, electroluminescent phosphor having luminance more than 100% that of the comparison sample is obtained. A magnesium oxide of a molar ratio in the range of 0.001 to 0.01 is more desirable, because it results in electroluminescent phosphor having luminance more than 10% higher than that of the comparison sample. However, in cases where the molar ratio of the magnesium oxide exceeds 0.05, the luminance is lower than that of the comparison sample.

Every one of Examples 1-(1) to 1-(7), which contain magnesium oxide, has a luminance half-life, in other words life span, longer than that that of the comparison sample, which contains no magnesium oxide. Magnesium oxide of a molar ratio in the range of 0.001 to 0.05 is more desirable, because it results in electroluminescent phosphor having a luminance half-life more than 25 hours longer than that of the comparison sample.

Magnesium oxide of a molar ratio less than 0.001 to zinc sulfide does not produce significant effect, because it does not result in luminance or life span much different from the comparison sample, which contains no magnesium oxide. Should the mixing ratio of magnesium oxide to zinc sulfide exceed 0.01, increase of the proportion of the magnesium oxide that does not contribute to emission of light reduces the luminance of the electroluminescent phosphor. Therefore, the most appropriate molar ratio of magnesium oxide added to zinc sulfide is in the range of 0.001 to 0.01 with respect to zinc sulfide to increase the luminance and life span of the electroluminescent phosphor.

(Test 2)

Next, a test was performed to evaluate the relationship between the firing temperature for the primary firing process and properties of the electroluminescent phosphor resulting from the test, i.e. its luminance and life span.

As shown in Table 2, samples of electroluminescent phosphor were produced in the same manner as Working Example 1-(3) in Test 1, except that the firing temperature for the primary firing process differed stepwise from 1100 to 1350° C. EL panels for evaluation were produced from these samples of electroluminescent phosphor, and the luminance and life span of each EL panel were measured.

Results of the test are shown in Table 2, together with the comparison sample and Working Example 1-(3).

TABLE 2

Alkaline earth metal oxide and its proportion
Magnesium oxide (MgO)
0.003 mol to 1 mol of zinc sulfide

| Sample | Temperature for primary firing (° C.) | Luminance (%) | Life span (luminance half-life) (hrs) |
|---|---|---|---|
| Comparison sample (no MgO) | 1250 | 100 | 250 |
| Working example 2-(1) | 1100 | 100 | 271 |
| Working example 2-(2) | 1150 | 110 | 276 |
| Working example 2-(3) | 1200 | 117 | 284 |
| Working example 1-(3) | 1250 | 120 | 288 |
| Working example 2-(4) | 1300 | 115 | 289 |
| Working example 2-(5) | 1350 | 110 | 300 |

As is evident from the test results shown in Table 2, a firing temperature in the range of 1150 to 1350° C. is desirable for the primary firing process because of improved luminance and life span. Because of further improved luminance and life span, a firing temperature in the range of 1200 to 1300° C. is even more desirable for the primary firing process.

When the firing temperature for the primary firing process was lower than 1150° C., no significant improvement was apparent in the luminance or life span. It may be because such a low temperature makes it difficult for solid chemical reaction between the zinc sulfide and the alkaline earth metal oxide to progress and results in insufficient introduction of the alkaline earth metal oxide into the zinc sulfide. A firing temperature higher than 1350° C. for the primary firing process not only reduced the yield due to excessive sublimation but also resulted in zinc sulfide particles too large to form desirable electroluminescent phosphor, because excessive growth of zinc sulfide particles made control of particle size difficult. For the reasons being as above, limiting the firing temperature for the primary firing process within the range of 1150 to 1350° C. improves the luminance and life span of the electroluminescent phosphor. These results proved that the luminance and life span of and electroluminescent phosphor can be improved further by limiting the firing temperature for the primary firing process within the range of 1150 to 1350° C.

(Test 3)

Next, a test was performed to evaluate the relationship between kinds of compounds to be added to zinc sulfide, i.e. alkaline earth metal oxides or compounds that change into alkaline earth metal oxides when fired, and characteristics of electroluminescent phosphor resulting from the test, i.e. its luminance and life span.

Samples of electroluminescent phosphor were produced under the same conditions as in Test 1, except that, as shown in Table 3, different alkaline earth metal oxides or compounds that change into alkaline earth metal oxides when fired were mixed into zinc sulfide, with the mixing ratio of each compound with respect to the zinc sulfide being in terms of a molar ratio of an alkaline earth metal oxide produced from the compound and that the firing temperature for the primary firing process was 1200° C. EL panels for evaluation were produced from these samples of electroluminescent phosphor, and the luminance and life span of the EL panels were measured.

Results of the test are shown in Table 3, together with the comparison sample in Test 1.

TABLE 3

| Sample | Alkaline earth metal oxide, etc. added | Molar ratio of oxide | Luminance (%) | Life span (luminance half-life) (hrs) |
|---|---|---|---|---|
| Comparison sample | None | 0 | 100 | 250 |
| Working example 3-(1) | Basic magnesium carbonate (3MgCO$_3$.Mg(OH)$_2$.3H$_2$O) (40.8% in terms of MgO) | 0.003 | 122 | 285 |
| Working example 3-(2) | Calcium carbonate (CaCO$_3$) | 0.005 | 115 | 300 |
| Working example 3-(3) | Strontium carbonate (SrCO$_3$) | 0.004 | 118 | 290 |
| Working example 3-(4) | Basic magnesium carbonate (3MgCO$_3$.Mg(OH)$_2$.3H$_2$O) (40.8% in terms of MgO) | 0.001 | 121 | 310 |
| | Barium carbonate (BaCO$_3$) | 0.0005 | | |
| Working example 3-(5) | Strontium nitrate (Sr(NO$_3$)$_2$) | 0.002 | 110 | 300 |
| | Calcium carbonate (CaCO$_3$) | 0.001 | | |
| Working example 3-(6) | Magnesium oxide (MgO) | 0.002 | 120 | 295 |
| | Calcium hydroxide (Ca(OH)$_2$) | 0.001 | | |
| Working example 3-(7) | Strontium carbonate (SrCO$_3$) | 0.004 | 116 | 305 |
| | Barium oxalate (BaC$_2$O$_4$) | 0.001 | | |

As is evident from the test results shown in Table 3, using one compound or a combination of compounds selected from among alkaline earth metal oxides and compounds that change into alkaline earth metal oxides when fired, was effective in improving the luminance and life span of the electroluminescent phosphor compared with the comparison sample, which contained none of these compounds. Examples of the aforementioned alkaline earth metal oxides and compounds that change into alkaline earth metal oxides when fired include various alkaline earth metal carbonates, such as calcium carbonate, strontium carbonate, barium carbonate, and basic magnesium carbonate, as well as such nitrates, hydroxides and oxalates as strontium nitrate, calcium hydroxide, and barium oxalate, In addition to the various salts mentioned above, any compound that changes into an alkaline earth metal oxide under a high temperature through decomposition or other process can achieve similar effects.

Furthermore, by confirming the relationship between the proportion of the alkaline earth metal oxide or the compound that changes into an alkaline earth metal oxide when fired with respect to the zinc sulfide and such properties as the luminance and life span, it was proved that using an alkaline earth metal oxide or such a compound produced similar effects to those produced by the magnesium oxide in Working Example 1.

As described above, electroluminescent phosphor obtained by adding at a given proportion to zinc sulfide at least one of the compounds selected from among alkaline earth metal oxides and compounds that change into alkaline earth metal oxides when fired and applying primary firing to the mixture at a temperature ranging from 1150 to 1350° C., has a host material that can be represented by the formula ZnS.aAO, wherein "A" is at least one element selected from among magnesium, calcium, strontium, and barium.

A host material that has become ZnS.aAO due to introduction of an alkaline earth metal oxide into zinc sulfide provides improved luminance and life span compared with the comparison sample which was fired without adding an alkaline earth metal oxide to the host material.

It can be surmised that there is distortion of zinc sulfide crystals in the host material (ZnS.aAO) of electroluminescent phosphor due to solid-solution of the alkaline earth metal oxide, which may be magnesium oxide or the like. An insufficient quantity of magnesium oxide makes it impossible to achieve effect of solid-solution. Excessive inclusion of magnesium oxide results in reduction in the luminance of the electroluminescent phosphor. This is probably because the excessive inclusion of magnesium oxide produces magnesium oxide that is unable to become solid-solution and does not contribute to emission of light.

Although the comparison sample, which did not contain an alkaline earth metal oxide, was produced by firing zinc sulfide to which magnesium chloride was added as a crystal growing agent, it can be surmised that the magnesium chloride functions merely as a crystal glowing agent, i.e. flux, and is not introduced in the form of an oxide into the zinc sulfide, because the melting point of magnesium chloride is 712° C.

As an alkaline earth metal oxide has a melting point higher than that of magnesium chloride (for example, magnesium oxide has a melting point of 2852° C.), it can be surmised that the alkaline earth metal oxide (magnesium oxide) is selectively introduced into zinc sulfide when fired at a temperature of 1150 to 1350° C.

Therefore, by producing electroluminescent phosphor that can be represented by the formula ZnS.aAO, wherein "A" is at least one element selected from among magnesium, calcium, strontium, and barium, by following a procedure that includes steps of adding at a given proportion to zinc sulfide at least one of the compounds selected from among alkaline earth metal oxides and compounds that change into alkaline earth metal oxides when fired and applying primary firing to the mixture at a temperature ranging from 1150 to 1350° C., the luminance and life span of said electroluminescent phosphor can be improved. By using thus produced electroluminescent phosphor, which has improved luminance and life span, a high-luminance, long-life EL type light-emitting element can be produced.

Electroluminescent phosphor according to the invention has such features as the host material being represented by the formula ZnS.aAO, of which "A" is at least one element selected from among magnesium (Mg), calcium (Ca), strontium (Sr), and barium (Ba), and "a" ranges from 0.001 to 0.01, either one of or both copper (Cu) or manganese (Mn) as an activator, and at least one element selected from among chlorine (Cl), bromine (Br), iodine (I), and aluminum (Al) as a co-activator. With the features as above, the luminance and life span of said electroluminescent phosphor can be increased by limiting "a", which represents the proportion of AO introduced into the zinc sulfide, within the range of 0.001 to 0.01.

Electroluminescent phosphor production method according to the invention comprises a primary firing process for firing a mixture of compounds at a temperature ranging from 1150 to 1350° C., an intermediate manufacturing process for producing an intermediate by washing, filtrating, and drying the fired substance resulting from the primary firing process, a secondary firing process for crystal transformation of a part of the intermediate produced from the intermediate manufacturing process, and an etching process for etching the intermediate fired by the secondary firing process. Said mixture of compounds are produced by adding to zinc sulfide (ZnS) at least one kind of compound selected from among copper compounds and a manganese compounds as a material of an activator, at least one kind of compound selected from among halides and aluminum compounds as a material of a co-activator, at least one kind of compound selected from among alkaline earth metal oxides and compounds that change into alkaline earth metal oxides when fired, and a halide or halides serving as a crystal growing agent. By following the processes described above, alkaline earth metal oxide(s) can be effectively introduced into a resulting electroluminescent phosphor. By limiting the firing temperature for the primary firing process within the range of 1150 to 1350° C., the luminance and life span of the electroluminescent phosphor are further improved.

Electroluminescent phosphor production method according to the invention enables the production of electroluminescent phosphor that has superior luminance and life span by using magnesium oxide (MgO) as an alkaline earth metal oxide and at least one of the compounds selected from among magnesium carbonate ($MgCO_3$), basic magnesium carbonate, calcium carbonate ($CaCO_3$), calcium hydroxide ($Ca(OH)_2$), strontium carbonate ($SrCO_3$), strontium nitrate ($Sr(NO_3)_2$), barium carbonate ($BaCO_3$), and barium oxalate ($BaC_2O_4$) as a compound that changes into an alkaline earth metal oxide when fired.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Electroluminescent phosphor comprising:
    a host material which is represented by the formula Zn.SaAO, wherein "A" is at least one element selected from among magnesium (Mg), calcium (Ca), strontium (Sr), and barium (Ba), and "a" ranges from 0.001 to 0.01;
    either one of or both copper (Cu) or manganese (Mn) as an activator; and
    at least one element selected from among chlorine (Cl), bromine (Br), iodine (I), and aluminum (Al) as a co-activator.

2. An electroluminescent phosphor production method comprising:
    a primary firing process for firing at a temperature in the range of 1150 to 1350° C. a mixture produced by adding to zinc sulfide (ZnS):
        at least one kind of compounds selected from among copper compounds and manganese compounds as a material of an activator,
        at least one kind of compounds selected from among halides and aluminum compounds as a material of a co-activator,
        at least one kind of compounds selected from among alkaline earth metal oxides and compounds that change into alkaline earth metal oxides when fired, and
        a halide or halides serving as a crystal growing agent;
    an intermediate manufacturing process for producing an intermediate by washing, filtrating, and drying a fired substance resulting from the primary firing process;
    a secondary firing process for crystal transformation of a part of the intermediate produced from the intermediate manufacturing process wherein at least part of said intermediate is crystal transformed from an α-crystal structure to a β-crystal structure, by copper sulfate ($CuSO_4$) and/or zinc sulfate ($ZnSO_4$) being mixed with said intermediate; and
    an etching process for etching the intermediate fired by the secondary firing process.

3. An electroluminescent phosphor production method as claimed in claim 2, wherein in the primary firing process:
    magnesium oxide (MgO) is used as an alkaline earth metal oxide, and
    at least one of the compounds selected from among magnesium carbonate ($MgCO_3$), basic magnesium carbonate, calcium carbonate ($CaCO_3$), calcium hydroxide ($Ca(OH)_2$), strontium carbonate ($SrCO_3$), strontium nitrate ($Sr(NO_3)_2$), barium carbonate ($BaCO_3$), and barium oxalate ($BaC_2O_4$) is used as a compound that changes into an alkaline earth metal oxide when fired.

* * * * *

UNITED STATES PATENT AND TRADEMARK OFFICE
CERTIFICATE OF CORRECTION

PATENT NO.       : 7,135,130 B2
APPLICATION NO.  : 10/775862
DATED            : November 14, 2006
INVENTOR(S)      : Junya Watabe et al.

It is certified that error appears in the above-identified patent and that said Letters Patent is hereby corrected as shown below:

Col. 6, line 19
  replace "ZnS.0.003MgO:Cu,Cl"
  with --ZnS•0.003MgO:Cu,Cl --

Col. 6, line 21
  replace " ZnS.0.003MgO:Cu,Cl "
  with -- ZnS•0.003MgO:Cu,Cl --

Col. 10, line 11
  replace "ZnS.aAO"
  with --ZnS•aAO--.

Col. 10, line 13
  replace "ZnS.aAO"
  with --ZnS•aAO--.

Col. 10, line 19
  replace "ZnS.aAO"
  with --ZnS•aAO--.

Col. 10, line 45
  replace "ZnS.aAO"
  with --ZnS•aAO--.

Col. 10, line 60
  replace "ZnS.aAO"
  with --ZnS•aAO--.

UNITED STATES PATENT AND TRADEMARK OFFICE
CERTIFICATE OF CORRECTION

PATENT NO.       : 7,135,130 B2
APPLICATION NO.  : 10/775862
DATED            : November 14, 2006
INVENTOR(S)      : Junya Watabe et al.

It is certified that error appears in the above-identified patent and that said Letters Patent is hereby corrected as shown below:

Col. 11, line 50
 replace "ZnS.aAO"
 with --ZnS•aAO--.

Signed and Sealed this

Sixteenth Day of January, 2007

JON W. DUDAS
*Director of the United States Patent and Trademark Office*